United States Patent
Davis et al.

(10) Patent No.: US 7,093,109 B1
(45) Date of Patent: *Aug. 15, 2006

(54) NETWORK PROCESSOR WHICH MAKES THREAD EXECUTION CONTROL DECISIONS BASED ON LATENCY EVENT LENGTHS

(75) Inventors: Gordon Taylor Davis, Chapel Hill, NC (US); Marco C. Heddes, Raleigh, NC (US); Ross Boyd Leavens, Cary, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/542,189

(22) Filed: Apr. 4, 2000

(51) Int. Cl.
*G06F 9/46* (2006.01)
(52) U.S. Cl. .................................. 712/228; 718/107
(58) Field of Classification Search ............. 709/100, 709/102, 103, 107, 108; 712/228; 718/1, 718/100, 103, 107, 108
See application file for complete search history.

(56) References Cited

U.S. PATENT DOCUMENTS

| | | | | |
|---|---|---|---|---|
| 5,251,205 A | * | 10/1993 | Callon et al. ............ | 370/392 |
| 5,327,526 A | * | 7/1994 | Nomura et al. ............ | 358/1.16 |
| 5,353,418 A | | 10/1994 | Nikhil et al. ............ | 395/375 |
| 5,357,617 A | | 10/1994 | Davis et al. ............ | 395/373 |
| 5,404,469 A | | 4/1995 | Chung et al. ............ | 395/375 |
| 5,404,560 A | * | 4/1995 | Lee et al. ............ | 712/208 |
| 5,483,641 A | | 1/1996 | Jones et al. ............ | 395/823 |
| 5,499,349 A | * | 3/1996 | Nikhil et al. ............ | 712/26 |
| 5,560,029 A | | 9/1996 | Papadopoulos et al. ..... | 395/800 |
| 5,613,114 A | * | 3/1997 | Anderson et al. ........... | 718/108 |
| 5,742,782 A | | 4/1998 | Ito et al. ............ | 395/386 |
| 5,752,031 A | * | 5/1998 | Cutler et al. ............ | 718/103 |
| 5,812,811 A | | 9/1998 | Dubey et al. ............ | 395/392 |
| 5,826,081 A | * | 10/1998 | Zolnowsky ............ | 709/103 |
| 5,887,166 A | | 3/1999 | Mallick et al. ............ | 395/672 |
| 5,907,702 A | | 5/1999 | Flynn et al. ............ | 395/678 |
| 5,913,059 A | | 6/1999 | Torii ............ | 395/674 |
| 5,933,627 A | * | 8/1999 | Parady ............ | 712/228 |

(Continued)

OTHER PUBLICATIONS

Kruse and Ryba, "Data Structures And Program Design in C++," 1999, pp. 153, 369-370, 444-445.*

(Continued)

*Primary Examiner*—Eddie Chan
*Assistant Examiner*—David J. Huisman
(74) *Attorney, Agent, or Firm*—Joscelyn G. Cockburn; James A. Lucas (57) ABSTRACT

A control mechanism is established between a network processor and a tree search coprocessor to deal with latencies in accessing the data such as information formatted in a tree structure. A plurality of independent instruction execution threads are queued to enable them to have rapid access to the shared memory. If execution of a thread becomes stalled due to a latency event, full control is granted to the next thread in the queue. The grant of control is temporary when a short latency event occurs or full when a long latency event occurs. Control is returned to the original thread when a short latency event is completed. Each execution thread utilizes an instruction prefetch buffer that collects instructions for idle execution threads when the instruction bandwidth is not fully utilized by an active execution thread. The thread execution control is governed by the collective functioning of a FIFO, an arbiter and a thread control state machine.

11 Claims, 4 Drawing Sheets

U.S. PATENT DOCUMENTS

| | | | |
|---|---|---|---|
| 5,944,816 A | 8/1999 | Dutton et al. | 712/215 |
| 5,968,167 A | 10/1999 | Whittaker et al. | 712/225 |
| 6,016,542 A * | 1/2000 | Gottlieb et al. | 712/225 |
| 6,052,708 A * | 4/2000 | Flynn et al. | 718/108 |
| 6,067,565 A * | 5/2000 | Horvitz | 709/218 |
| 6,341,347 B1 * | 1/2002 | Joy et al. | 712/228 |
| 6,658,447 B1 * | 12/2003 | Cota-Robles | 718/103 |
| 6,931,641 B1 * | 8/2005 | Davis et al. | 718/108 |

OTHER PUBLICATIONS

Hennessy and Patterson, "Computer Architecture—A Quantitative Approach, $2^{nd}$ Edition," 1996, p. 40.*

Fiske et al., "Thread Priorization : A Thread Scheduling Mechanism For Multiple-Context Parallel Processors," Jan. 1995☐☐.*

Weiss, Data Structures & Algorithm Analysis in C++, 2nd Edition, 1999, pp. 211-212.*

* cited by examiner

FIGURE 1 - Standard Network Processor Configuration (PRIOR ART)

FIGURE 2 - Network Processor Configuration with Multiple Execution Threads

FIGURE 3 - Thread Execution Control

FIGURE 4 - Multiple Execution Threads

NETWORK PROCESSOR WHICH MAKES THREAD EXECUTION CONTROL DECISIONS BASED ON LATENCY EVENT LENGTHS

The present application relates to application Ser. No. 09/542,206 entitled "CONTROLLER FOR MULTIPLE INSTRUCTION THREAD PROCESSORS" filed Apr. 4, 2000 and assigned to the assignee of the present application.

FIELD OF THE INVENTION

This invention relates to the field of executing multiple threads of instructions in a computer system. More specifically, it relates to the means of efficiently processing multiple threads so as to minimize the impact of latency in accessing data especially data formatted in tree structures.

BACKGROUND OF THE INVENTION

Network processors are designed for efficient implementation of switching and routing functions. The critical performance measurement for Network processors is the number of machine cycles required to process a typical packet or data frame. This processing is typically broken down into two major parts: the instructions executed by the Network processor CPU (central processing unit), and the access of routing and control tables which are typically stored in a memory source which is shared among several Network processor CPUs. CPU instruction execution is typically stalled during access to the routing tables, adding significantly to the number of machine cycles required to process a packet. In fact, the time to complete an access to one of these tree structures may be 2 or 3 times longer than the time required by the CPU to set up for the access and process the resulting data. The data for these routing and control tables is typically formatted in a tree structure which requires a specialized coprocessor or tree-search engine (TSE) to efficiently access the desired table entry. Other coprocessors, set up to work with data in local data storage, may also stall the CPU, but for shorter durations.

The related art reveals a number of previously patented implementation systems using multiple threads:

U.S. Pat. No. 5,357,617 (Davis, et al.)—This patent deals with switching from one execution thread to another with zero overhead. More specifically, the CPU continuously switches between multiple instruction threads in a time-division multiplexed allocation of CPU resources. In other words, the multiple instruction threads are controlled via a static interleaving mechanism.

U.S. Pat. No. 5,404,469—This patent extends the concept of time-division multiplexed allocation of CPU resources to a processor with a VLIW (very long instruction word) architecture.

U.S. Pat. No. 5,694,604—This patent describes a typical software multiprocessing approach in which a selected instruction thread is allocated a specified amount of time to execute, after which its context is saved, and a previous context for the next instruction thread is restored. In this type of system, each thread typically executes for an extended period of time since there is significant cost (in machine cycles) to save and restore machine context when switching from one thread to another.

U.S. Pat. No. 5,812,811—This patent refers to running multiple instruction threads in parallel which are part of the same program, in order to accelerate completion of the program. It also deals with speculative execution of paths which may or may not be required to complete the execution of the program.

U.S. Pat. No. 5,933,627—This patent describes switching to an alternate thread when the CPU is stalled because required data is not found in local cache. The system requires the CPU to explicitly control which thread would gain control of the CPU. This patent also describes multiple threads as pieces of the same program, rather than independent processes.

U.S. Pat. No. 5,694,603—This patent is another description of a typical software multiprocessing approach which includes preemptive switching from one thread to another.

SUMMARY OF THE INVENTION

It is an object of the current invention to make more efficient use of both the network processor CPU and a coprocessor such as a tree search coprocessor by employing multiple instruction execution threads with zero overhead to switch execution from one thread to the next, thereby enabling an overlap of one instruction thread's access to a long-latency access (i.e. tree search) with an alternate instruction thread's CPU instruction execution.

Another object of the current invention is to pipeline access to a search tree structure to permit multiple execution threads to have overlapping access to the structure.

Yet another object is to transfer full or temporary control to the next thread in a queue when execution of a thread stalls due to a latency event.

These and other objects that will become apparent from the specification are achieved in the manner to be hereinafter described.

Multiple threads are efficiently used in a pathway in association with a processing system such as a network processor and a tree search structure, including the following steps and related structure.

Access to data such as the data in a tree search structure is pipelined to enable the multiple execution threads to have overlapping search access. A first thread in the queue is executed until a latency event of a given duration occurs which causes the execution to stall. Control of the execution is then transferred to the second thread in the queue when execution of the first thread stalls. If the latency event is programmed to be short, e.g. 25 machine cycles or less, the control is temporarily transferred to the second thread. On the other hand, if the latency event is programmed to be longer, e.g. over 25 cycles, full control is transferred to the second thread in the queue. The duration of a typical machine cycle may be between about 5 and about 7.5 nanoseconds. The trend is toward ever faster cycles as technology continues to evolve.

The invention also relates to a network processor configuration comprising a CPU with multiple threads, an instruction memory, and a prefetch queue between the instruction memory and the CPU. An array of general purposes registers communicates with the CPU. The configuration includes local data storage and a thread execution control for the general register array and the local data storage. A first coprocessor connects the CPU to a local data storage. A pipelined coprocessor connects a shared remote storage and the CPU.

The invention includes a thread execution control (TEC) for the execution of multiple independent threads in a processor configuration. The TEC comprises a priority FIFO to grant priority to one of a plurality of threads; an arbiter to control the execution of the prioritized threads, and a thread control state machine for shifting execution control between threads upon the occurrence of latency events. The thread priority is granted by the FIFO by loading a thread number into FIFO when a packet is dispatched to the processor. The thread number is unloaded from the FIFO when a packet has been enqueued for transmission. When a long latency event occurs, a thread number is circulated from highest priority to lowest priority in the FIFO. The thread outlets of the FIFO are used to determine priority depending on the length of time a thread has been in FIFO.

The thread execution control includes a thread control state machine. The machine grants control of execution from a first thread to a second thread when a latency event occurs in the execution of the first thread. The transfer is for temporary control to the second thread if the latency event causes a short latency stall of, e.g. less than about 25 cycles. On the other hand, the transfer to the second thread is for full control if the latency event is a long latency event that causes a stall of more than about 25 cycles. Commonly, the threshold between a short latency and a long latency is decided by the microcode programmer and is encoded into the program.

The invention also comprises a system for granting execution priority to an independent thread based on the logical function of an arbiter based on the following Boolean expression:

$$G_n = R_n \cdot \{(P_A = n) + \overline{R_{PA}} \cdot (P_B = n) + \overline{R_{PA}} \cdot \overline{R_{PB}} \cdot (P_C = n) \ldots \}$$

where:

$G_n$ is a grant from a given thread $_N$ $R_n$ is a request from a given thread $_N$;

$P_A$, $P_B$ and $P_C$ represent a plurality of thread numbers depending on the number of threads in use and ranked by alphabetical subscript;

$R_{PA}$ is a request from the highest priority thread in the FIFO; and $_n$ is a subscript identifying a thread by the bit or binary number The system determines whether a request R is active or inactive. It also determines the priority of the threads and then matches the request R with the corresponding thread P. Finally, it grants a request for execution if the request is active and if the corresponding thread P has the highest priority.

The invention also involves the use of a prefetch buffer in connection with a plurality of independent thread processes in such a manner as to avoid an immediate stall when execution is granted to an idle thread. This involves determining whether the buffer is being utilized by an active execution thread. During periods that the buffer is not being used by the active execution thread, the buffer is enabled to prefetch instructions for an idle execution thread.

DETAILED DESCRIPTION OF THE INVENTION

The current invention is distinct from the related art in that the invention specifically relates to independent processes in each of the instruction execution threads (each of which relates to a different packet being processed), and the invention specifically deals with latency in accessing data. Each of the execution threads is an independent process executing a sequence of instructions as the threads are allowed to gain access to the processor hardware. An additional aspect of the current invention is that the tree search coprocessor is pipelined to enable multiple execution threads to each have access simultaneously but at different phases (overlapping) in the tree search pipeline. Preferably, the invention employs multiple instruction execution threads with zero overhead to switch execution from one thread to the next. the threads are queued to provide rapid distribution of access to shared memory. Queueing of the threads serves to get the thread of highest priority to its long latency event as quickly as possible.

Another aspect of the current invention relates to multiple instruction prefetch buffers, one for each execution thread. These prefetch buffers enable prefetch of instructions for idle execution threads during intervals where instruction bandwidth is not being fully utilized by active execution threads. This helps to insure that when control is switched to a new execution thread, the instruction prefetch buffer for that thread will be full, thus avoiding the possibility of the new thread stalling immediately due to lack of available instructions to execute. Accordingly, access priority to instruction memory is controlled so that the currently executing thread receives top priority, while the execution thread positioned to take control if the current thread stalls is given second priority. Likewise, the execution thread at the bottom of the execution queue is given last priority in instruction fetch access.

An additional aspect of the current invention is a thread control state machine which determines the current active execution thread and which grants full control to the next thread when execution of the active thread stalls due to a long latency event (i.e. tree search), or temporary control to the next thread when execution stalls due to a short latency event (i.e. coprocessor action in local data storage, or instruction fetch latency). If temporary control is granted to an alternate thread, then control is returned to the original thread as soon as it is unblocked. In contrast, if full control is granted to an alternate thread, that alternate thread will remain in control until it becomes blocked. This avoids wasting cycles for short latency events, but also allows the primary execution thread to reach the long latency event sooner. Otherwise, multiple execution threads might reach a long latency event at about the same time which would reduce the benefit of overlapping one thread's CPU execution with an alternate thread's tree search.

Figure 1:
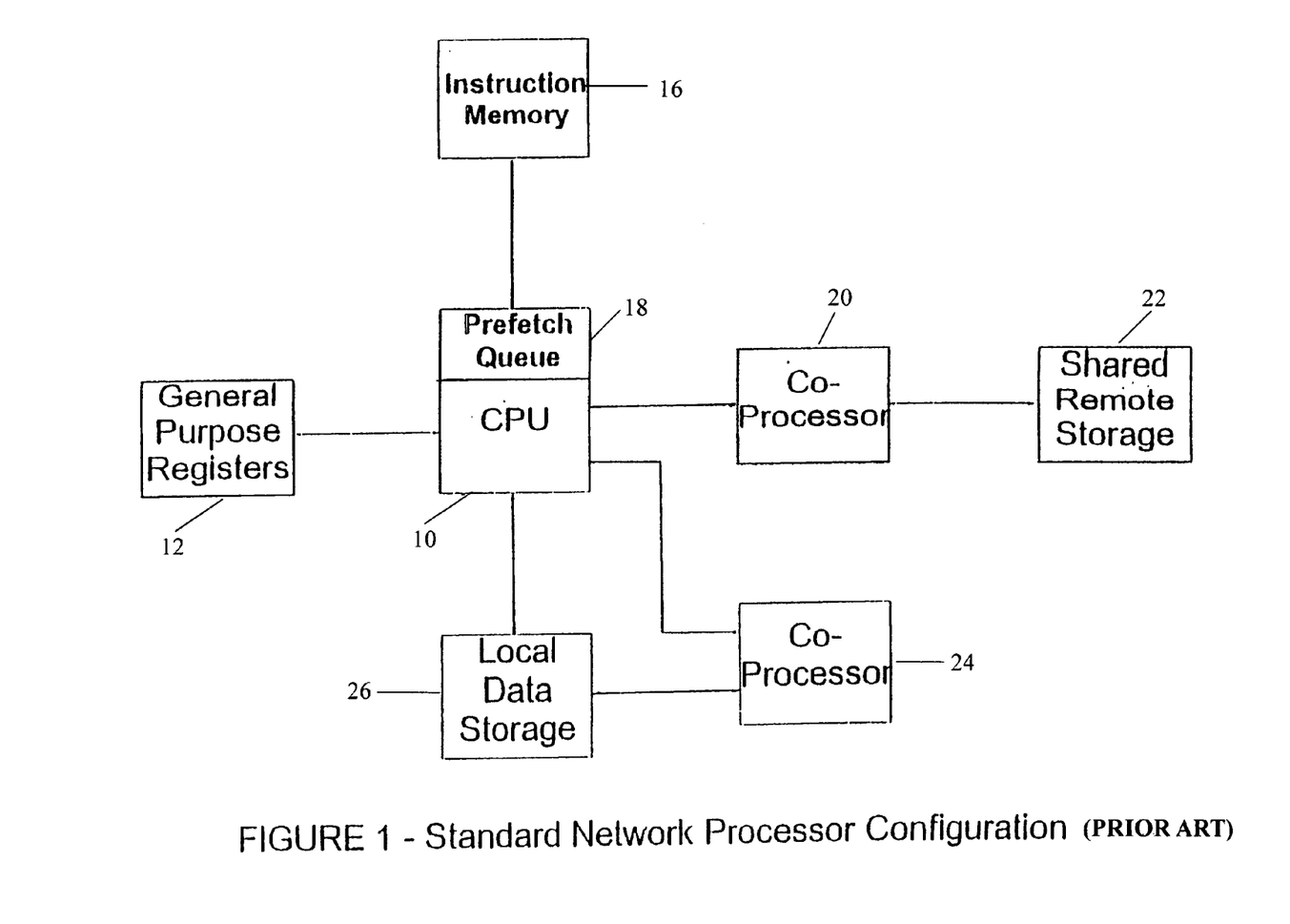
FIG. 1 illustrates a network processor architecture with two coprocessors.

FIG. 1 shows a typical network processor configuration comprising a single thread central processing unit (CPU) 10 and a plurality of general purpose registers 12 implemented in a single register array in two-way communication with the CPU. Instructions are transmitted between an instruction memory 16 and a single prefetch queue 18 coupled to the CPU. A first coprocessor 20 communicates with the CPU 10 and accesses data contained in remote storage 22. This remote storage can share data with a plurality of other processors (not shown) through the coprocessor 20. Local data storage 26 is used exclusively by the coprocessor 24 and is not shared with the other processors. In the case of multiple threads, all of the threads have access to the local data storage.

Figure 2:
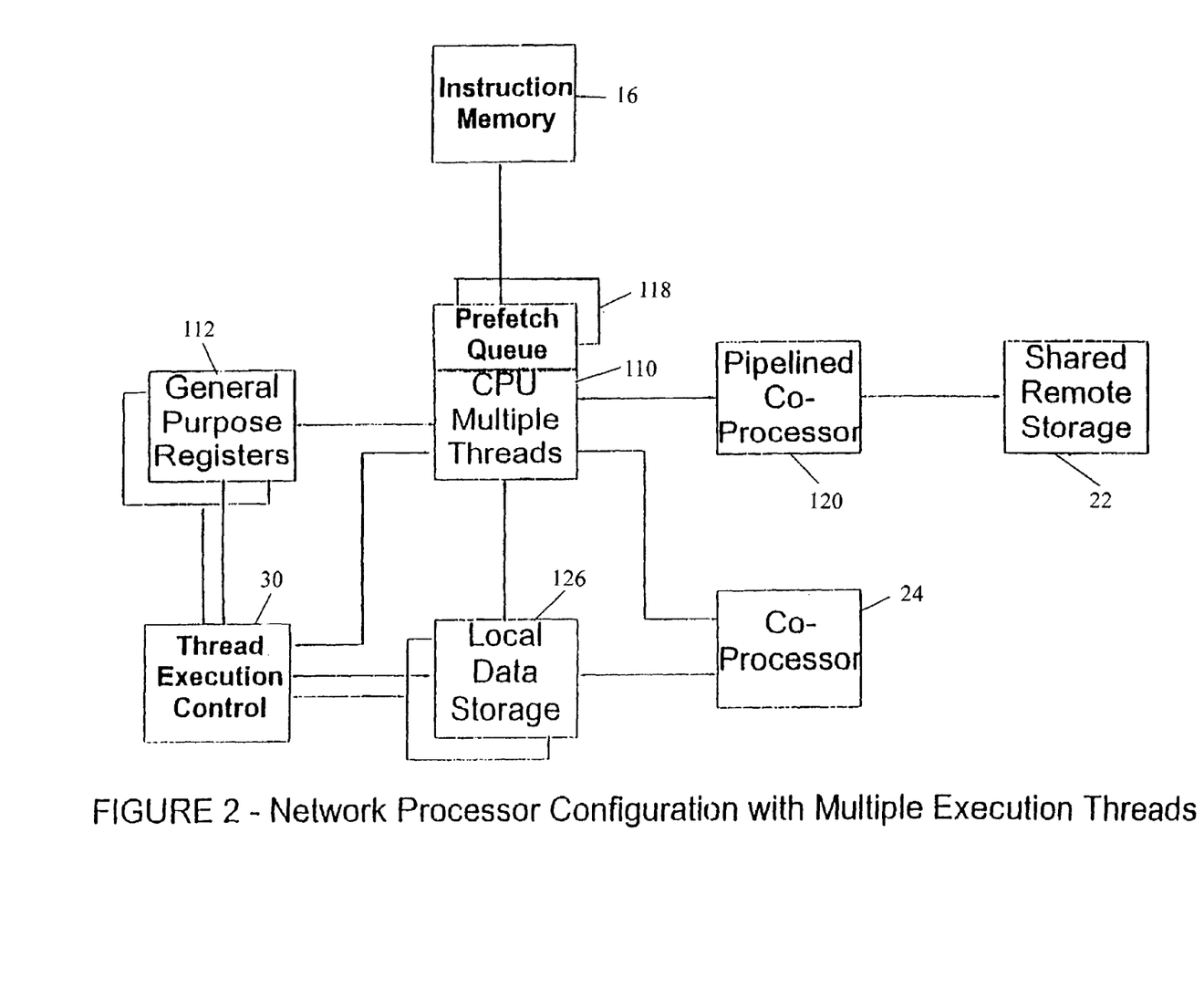
FIG. 2 illustrates one embodiment of the current invention.

Turning now to FIG. 2, where the same numbers are used to refer to the identical components as in FIG. 1, there is shown a CPU 110 configured with multiple execution threads. Instructions are transmitted between an instruction memory 16 and prefetch queues 118 coupled to the CPU 110. One prefetch queue is used for each independent execution thread. A plurality of general purpose registers 112 are implemented in a single register array serving the CPU. The array has one address bit that is subject to control by a thread execution control (TEC) 30 which determines which part of the register array is used by a thread. The remaining address bit or bits are controlled by the CPU. In a preferred embodiment, the local storage 126 is segmented so that each thread has its own logical private space in the local storage. For example, two threads would each share ½ of the space, and four threads would each have ¼ of the local storage space. The TEC 30 also determines which segment of the local data storage 126 is to be used for a particular thread. Data can be exchanged directly between the local data storage 126 and the CPU 110. The local data storage is fully addressable by the CPU with working areas identified by an index register within the general purpose register array. A first coprocessor 120 is pipelined between the CPU 110 and the shared remote storage 22. A second coprocessor 24 accesses the local data storage 126 and communicates with the CPU 110.

Referring again to FIG. 2, the CPU, even though it supports multiple threads, is not substantially different from the single-threaded CPU of FIG. 1. The key difference required to support multiple threads is found in the functioning of the thread execution control (TEC) 30. Control logic within the TEC constantly monitors the current execution thread, and if the current thread stalls, the control logic switches control to an alternate execution thread. In addition, the control logic identifies the nature of the event which causes an active execution thread to stall and transfers either temporary or full control based on the length of the event.

Figure 3:
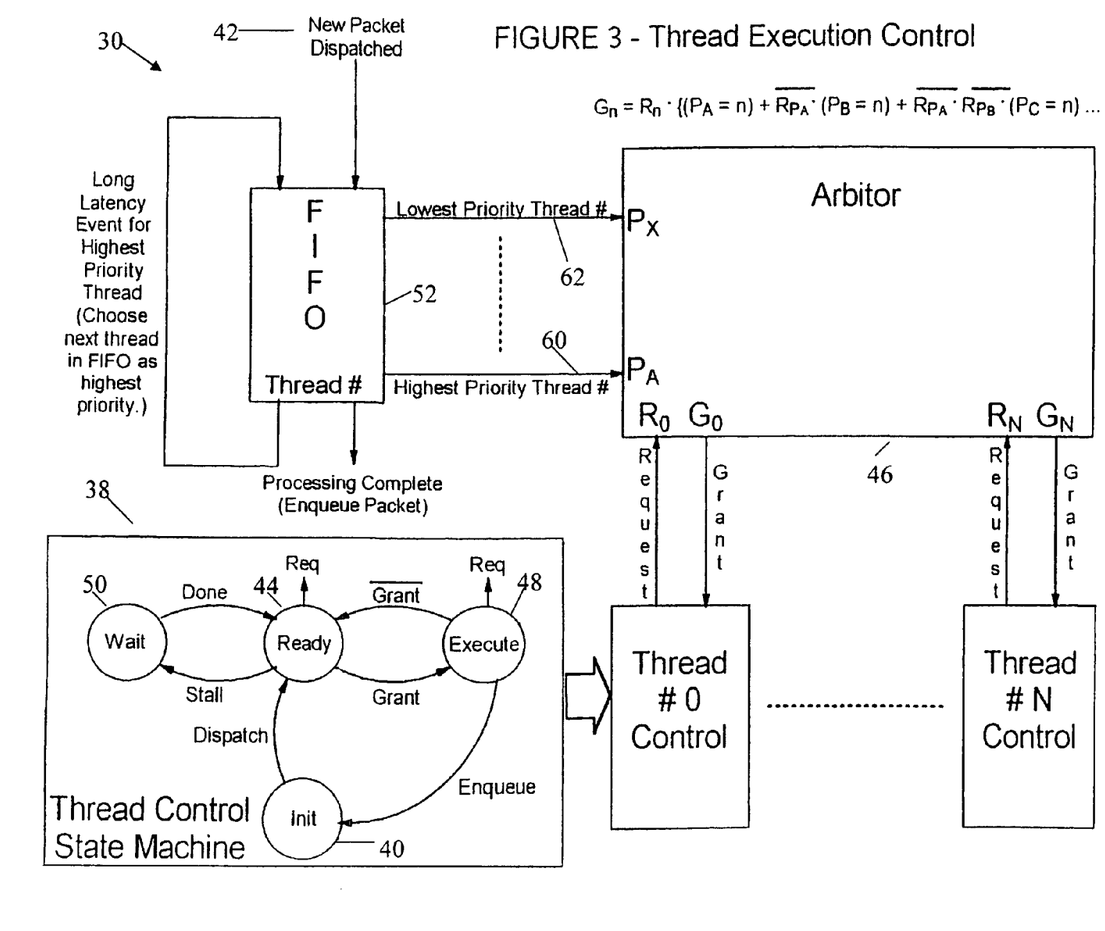
FIG. 3 is a thread execution control diagram.

FIG. 3 shows the thread execution control (TEC) 30 including FIFO 52, Arbiter 46 and a plurality of Thread Controls #0 through #N. Each of the Thread Controls includes a thread control state machine 38. Controls different from the state machine 38 may be used without deviating from the teachings of the present invention.

The thread execution control operates in the following manner. When the computer is first powered up, each thread is in the initialize state 40. When a packet 42 is dispatched to a processor, the corresponding thread is moved to the ready state 44 at which time it starts requesting cycles for execution.

The arbiter 46 is the device that grants the execution cycle to the thread. If the cycle is granted, then the thread moves from the ready state 44 to the execute state 48. In the execute state, the thread continues to make requests until execution stalls due to a latency event or the packet being processed is enqueued, thereby implying that the code work on that packet is done. If cycles are no longer granted, this implies that another thread is in control. That is the only reason that the arbiter 46 would not grant a cycle to the thread control state machine 38. But in either of these two states (ready or execute), the thread will continuously request new execution cycles pausing for latency events, until the end of the packet processing is reached and the next packet 42 is queued to be dispatched to the arbiter. The system then goes back to the initialize state and waits for the next packet 42.

The wait state 50 deals with either a long or a short latency event. Regardless of which event occurs, the processor stalls and the active thread defaults to the wait state. The thread then quits requesting execution cycles until the latency event is completed.

The same dispatch action that moves a thread from the initialize stage 40 to the ready state 44 enters the thread number into the FIFO 52 so that the thread to which the first packet is dispatched will become the highest priority thread PA. Subsequent dispatch actions supply additional thread numbers into the FIFO. The thread number in the highest priority position of the FIFO will stay in that position until it encounters a long latency event whereupon the thread is rotated back to the beginning of the FIFO and goes from the highest priority $P_A$ to the lowest priority thread Px. A short latency event will not cause the thread to lose its priority in the FIFO.

If the thread is done with the processing of the packet 42, the packet is enqueued for transmission to an output port, the thread control state machine transitions to the initiate state from the execute to initialize state, and the thread number is removed from the FIFO 52.

New packets are dispatched from a high-level controller (not shown). This controller, outside of the processor chooses a thread and a processor to handle each packet. That decision provides an input command to the FIFO 52. It also provides an input to the state machine 38 instructing the machine to move from the initialize state to the ready state. Along with that command from the external controller, the thread number to which the packet is to be dispatched must also be delivered from the controller to the FIFO. As an example when using 4 threads, the two bit binary code (00; 01; 10; or 11) identifies the thread that is going to handle the packet being dispatched. If the system uses two threads, these are identified by a single bit binary code (0 or 1).

From the FIFO are multiple outputs to the arbiter 46 for each thread if all of the threads are active. Two such outputs are shown as 60 for the highest priority thread, $P_A$ and 62 for the lowest priority thread Px. In the case of two threads, PX=PB, and there are two outputs. For four threads, PX=PD, resulting in 4 outputs. Most likely the system would handle threads in multiples of two. However it is possible for three or some other number to be used.

As previously mentioned, going to four threads produces some gain in performance while requiring additional hardware and the expenses associated therewith. Four threads would make sense with different design parameters. However, the preferred embodiment of the present invention utilizes two threads. There are a number of factors that go into the decision as to whether to use two or four threads. One factor is the size of local storage. The smaller the storage, the more logical it is to use four threads or even more. Also the question about how long the latency event is relative to the length of the code execution path is a factor as well.

Granting execution cycles to a specific thread by the thread execution control is based on the logical function of the arbiter based on the Boolean expression:

$$G_n = R_n \cdot \{(P_A = n) + \overline{R_{PA}} \cdot (P_B = n) + \overline{R_{PA}} \cdot \overline{R_{PB}} \cdot (P_C = n) \ldots \}$$

This equation is a generalized equation of how the arbiter decides whether or not to activate the grant signal (G) given that it has a request (R) coming in from the state machine 38.

In the formula, $G_n$ equals $G_0$, $G_1$ etc. up to as many threads as there are. The priority to be given to a thread is represented by (P). The equation reduces to two terms for two threads, and is extended to four terms for four threads.

There are multiple elements to the grant if the request is a command for $R_o$ and $G_0$. Looking at $R_o$, it must be active before the system will consider issuing grant $G_o$. Then the system looks at multiple ways to decide to execute that grant assuming the request is active. If the thread is the highest priority, there is no need to look at what any of the other threads are doing. The arbiter immediately signals a grant to the thread number allowing it to execute. Otherwise, with the thread number $P_A$ the system finds a request number $R_{PA}$ for that thread, which is the request with the highest priority. If the request having a highest priority is not active then it looks at the request ($R_{PB}$) having the second highest priority and matches it with the thread ($R_B$) in which the system is interested. This thread number is represented by one bit (for 2 threads) or two bits (for 4 threads). The equation stops at two terms if there are two threads or at four terms for four threads.

Figure 4:
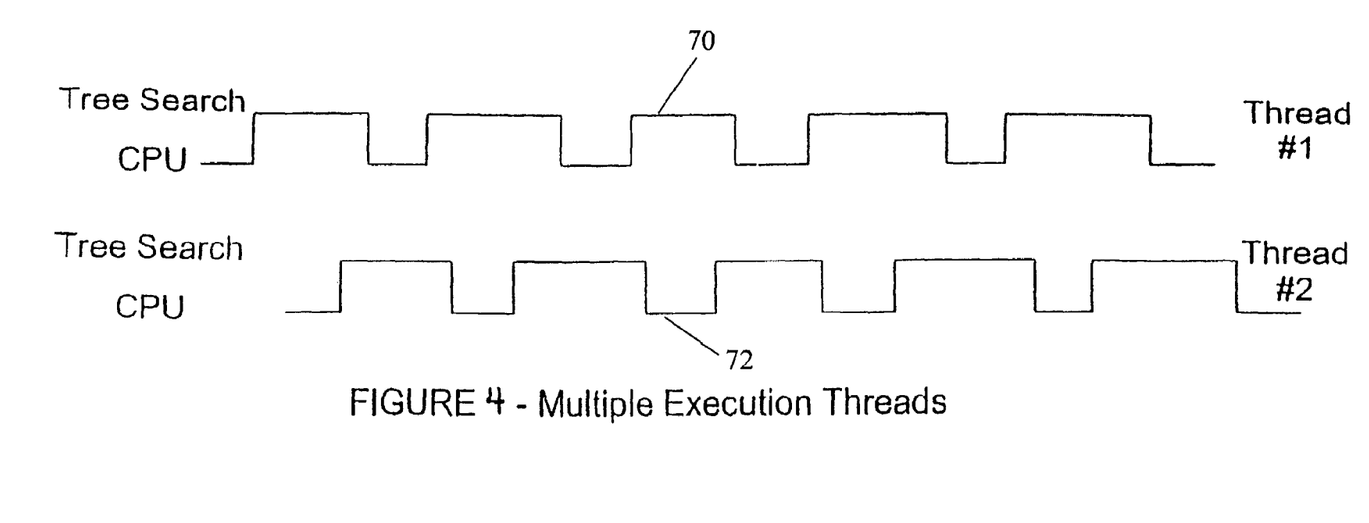
FIG. 4 shows waveforms for two execution threads and a single CPU.

Turning now to FIG. 4, there are shown two timing diagrams 70, 72 for two tree search threads generally showing the overlap of the tree searches and a CPU execution on the two thread wave forms. When the wave forms are low, the CPU is executing. When the wave forms are high, the CPU is waiting for a tree search. When comparing the wave forms of the timing diagrams for the two threads it is noted that they are never low at the same time. They both share the same CPU and it is intuitive that they can not both be executing CPU cycles at the same time. On the other hand, because of pipelining of the tree search engine, they can be in various overlapping stages of tree searches at the same time.

There are basically two types of events which might cause execution to stall, those which cause a short interruption and those which cause an extended interruption of the current program flow. A short interruption may be caused by a branch instruction which requires the instruction prefetch queue to be refilled because of a change in the program flow. Alternately, the program may stall while waiting for a coprocessor to perform a task relating to data in the processor's local memory. An example of this would be for a checksum coprocessor to calculate a new checksum on a modified header field. An event is considered a short interruption if the latency is less than 25 processor cycles. Long latency events typically introduce a latency more than 25 and typically in excess of 50 to 100 processor cycles. These have a much more significant impact on overall performance.

There are numerous alternative means for determining a long or a short latency event. The length of latency can be under the control of the programmer whereupon the hardware or its configuration is not a factor in the determination. On the other hand, a threshold register could be set with a 25 cycle threshold, and the hardware would determine how many cycles an operation was going to require and make an automatic decision based on that determination.

A coprocessor instruction is one type of instruction that the processor executes. Some of the bits in the field identify which coprocessor is intended. One bit defines the particular instruction as a long or a short latency event. Thus, it is possible that a programmer can define two identical accesses to control memory, one defined as a long latency event and the other as a short latency event. The thread execution control function is designed to minimize the impact of these long latency events. Accordingly, a long latency event will cause full control to switch to an alternate execution thread, while a short latency event will cause only a temporary switch to an alternate thread.

Even though the multi-thread CPU is substantially the same as a single threaded CPU, a number of the peripheral functions are replicated for each execution thread. General purpose registers and local data storage are both replicated for each instruction thread, as illustrated in FIG. 2. This allows a complete context switch with zero overhead (in terms of processor clock cycles). In the preferred embodiment, the multiple sets of general purpose registers are actually implemented in a single larger register array, with one (or more if the number of threads exceeds 2) address bit being controlled by the Thread execution control logic and the remaining address bits being controlled by the CPU according to instructions being executed.

Alternately, two register arrays could be addressed simultaneously by the CPU, and the Thread execution control logic can control an array select or multiplexer circuit to determine which array output would be delivered to the CPU. Each execution thread may be given a completely independent working area in Local data storage by using a single larger memory array, with one (or more if the number of threads exceeds 2) address bit being controlled by the Thread execution control logic and the remaining address bits being controlled by the CPU according to instructions being executed. Alternately, the Local data storage can be fully addressable by the CPU, with individual working areas identified by an index register within the general purpose register array. This has the advantage of enabling some shared memory for common data such as tables, but would require all accesses to private space to be done with indexed address modes which might limit the flexibility of available instructions.

Although there is a common path to instruction memory, each instruction thread is associated with a different instruction pointer and instruction prefetch queue, each of which may contain multiple instruction words staged for future execution. In the preferred embodiment, there are two execution threads, each of which has an eight-instruction prefetch queue. The active execution thread is given first priority for fetching instructions. In the preferred embodiment, multiple network processors are implemented on the same chip and share a common instruction storage. Accordingly, if multiple processors request access to the instruction memory at the same time, the instruction fetch requests for active threads will always be given precedence over those for idle threads, even if the request from an idle thread comes in earlier.

Note that while working registers and local storage are replicated for each instruction thread, all threads share a common CPU (including its coprocessors) and path to instruction memory. The peak bandwidth requirement for instruction fetching does not increase, but the effective utilization of the available bandwidth for instruction fetching is increased significantly with multiple execution threads.

The typical processing required in the network processing system results in tree search access which may be two or three times the number of machine cycles as that required to set up the search and process the results. This has two significant implications. First, the CPU execution for each of two threads can easily be overlapped with the tree search cycles for the opposite thread. In fact, with just two threads, there will still be a significant number of CPU cycles for which both threads are stalled, suggesting that three or four threads would further improve the utilization of the CPU.

While doubling from one to two threads essentially doubles the CPU utilization, doubling the number of threads again to four may not quite double the efficiency of CPU utilization to 4×, at least within the framework of the preferred embodiment of the present invention. This is because with four threads, the tree search latency isn't long enough to ensure the other three threads will run. The preferred embodiment is limited to two threads, because the additional cost of additional threads (larger local data storage and general purpose register arrays) is significantly more that the cost saved by not replicating the CPU. Thus, it makes sense if doubling the threads results in a corresponding doubling of processing power, but when doubling the number of threads results in something less than doubling (i.e. 1.5×) of processing power, then adding additional independent CPUs tends to be preferable. The decision of how many threads is preferable is within the capability of a person having the requisite skills in the art and depends on the relative difference between CPU clock cycles and tree-search clock cycles for the processing system of interest, as well as the cost of implementing the core CPU vs. the cost of replicating the general purpose registers and local data storage.

The second implication of the distribution of machine cycles between CPU execution and tree-searches is that if interleaving is implemented with a requirement for one tree search to complete before the next one can be started, then the overlapping of two instruction threads will not be as efficient. Each packet process will in fact be stretched out due to numerous instances where a tree search is started by the CPU but the tree search is stalled waiting for the tree search from the other thread to complete. To avoid this penalty, the tree search coprocessor is modified to include several pipelined phases. Thus, a tree search from one thread does not need to wait until the other thread's tree search is complete, but only until the other thread's tree search progresses to the second phase of its pipeline. In reality, by the time a second thread has executed the instructions to set up a tree search, a previous tree search from the other thread will in all likelihood be already beyond that first pipeline phase, thus resulting in a complete avoidance of stalls in the tree search process. This of course leads to additional motivation for the temporary thread switching on short latency events which was described previously, in order to avoid having tree searches from two different threads contending for the same pipeline phase.

An alternate approach is to replicate more single threaded CPUs. The disadvantage of that approach is that it costs more to achieve the same level of performance. It also increases the peak bandwidth requirements on various busses (i.e. to instruction memory or shared remote storage). Multiple threads result in the same average bandwidth, but half the peak bandwidth (in the case of two threads) which can have significant secondary effects on performance due to contention for these shared resources.

The invention has been described in connection with its use on a network processor and a tree search structure. However, it should be noted that the invention is also useful with other processor systems and for retrieving data from sources other than tree search engines. For instance, the thread execution control can be used to access other coprocessors.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. The use of multiple threads in association with a network processor and accessible data available in a tree search structure, including the steps of:
   a) providing multiple instruction execution threads as independent processes in a sequential time frame;
   b) encoding a processor instruction to select an event from the group consisting of a short latency event and a long latency event;
   c) queuing the multiple execution threads to have overlapping access to the accessible data available in said tree search structure;
   d) executing a first thread in a queue;
   e) transferring control of the execution to the next thread in the queue upon the occurrence of an event that causes execution of the first thread to stall; and
   f) when the stall is due to the short latency event, returning control to the first thread when the event is completed, and when the stall is due to the long latency event, retaining full control by the next thread until the next thread becomes blocked.

2. The use of multiple threads according to claim 1 wherein the processor instruction is encoded to select the short latency event.

3. The use of multiple threads according to claim 1 wherein the processor instruction is encoded to select the long latency event.

4. The use of the multiple threads according to claim 1 wherein the threads have overlapping access to shared remote storage via a pipelined coprocessor by operating within different phases of a pipeline of the coprocessor.

5. A network processor that uses multiple threads to access data available in a tree search structure, including:
   a) a CPU configured with multiple instruction execution threads as independent processes in a sequential time frame;
   b) a thread execution control for
      1) queuing the multiple execution threads to have overlapping access to the data to be accessed;
      2) executing a first thread in the queue;
      3) encoding a processor instruction to select an event from the group consisting of a short latency event and a long latency event;
      and
      4) transferring control of the execution to the next thread in the queue upon the occurrence of an event that causes execution of the first thread to stall, said thread execution control including control logic responsive to the type of event causing the execution to stall that a) temporarily transfers control to the next thread when execution stalls due to the short latency event and returns control to the first thread when the short latency event is completed, and b) transfers full control of the execution to the next thread when execution of the fist thread stalls due to the long latency event with execution continuing on the next thread even after the long latency event is completed, until the next thread becomes blocked.

6. The processor according to claim 5 wherein the processor instruction is encoded to select the short latency event.

7. The processor according to claim 5 wherein the processor instruction is encoded to select the long latency event.

8. The processor according to claim 5 wherein the threads have overlapping access to shared remote storage via a pipelined coprocessor by operating within different phases of a pipeline of the coprocessor.

9. The processor according to claim 5 wherein the processor uses zero overhead to switch execution from one thread to the next by giving each thread access wherein general purpose registers and local data storage are made available to the processor by providing one address bit under the control of the thread execution control logic and by providing the remaining address bits under the control of the processor.

10. The processor according to claim 9 wherein the processor is capable of simultaneously addressing multiple register arrays, and the thread execution control logic includes a selector to select which array will be delivered to the processor for a given thread.

11. The processor according to claim 10 wherein the local data storage is fully addressable by the processor, an index register is contained within the selected register array, and the thread execution control has no address control over the local data storage or the register arrays.

* * * * *